(12) United States Patent
Zhao et al.

(10) Patent No.: US 12,092,916 B2
(45) Date of Patent: Sep. 17, 2024

(54) LED DISPLAY PANEL AND DISPLAY DEVICE

(71) Applicants: Huizhou China Star Optoelectronics Display Co., Ltd., Huizhou (CN); TCL China Star Optoelectronics Technology Co., Ltd., Shenzhen (CN)

(72) Inventors: Jun Zhao, Huizhou (CN); Bin Zhao, Huizhou (CN); Juncheng Xiao, Huizhou (CN); Hongyuan Xu, Huizhou (CN); Xing Lei, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/621,260

(22) PCT Filed: Dec. 16, 2021

(86) PCT No.: PCT/CN2021/138694
§ 371 (c)(1),
(2) Date: Dec. 21, 2021

(87) PCT Pub. No.: WO2023/102997
PCT Pub. Date: Jun. 15, 2023

(65) Prior Publication Data
US 2024/0036382 A1    Feb. 1, 2024

(30) Foreign Application Priority Data
Dec. 9, 2021 (CN) .......................... 202111495725.9

(51) Int. Cl.
*G02F 1/1335* (2006.01)
*G02F 1/1333* (2006.01)
(Continued)

(52) U.S. Cl.
CPC .. *G02F 1/133512* (2013.01); *G02F 1/133314* (2021.01); *G02F 1/133603* (2013.01); *G02F 1/1339* (2013.01)

(58) Field of Classification Search
CPC ......... G02F 1/133512; G02F 1/133314; G02F 1/133603; G02F 1/1339; G02F 1/1335;
(Continued)

(56) References Cited

U.S. PATENT DOCUMENTS

2005/0185114 A1   8/2005  Cok
2017/0317243 A1*  11/2017 Park ..................... H01L 33/486

FOREIGN PATENT DOCUMENTS

CN    102339565    2/2012
CN    102956793    3/2013
(Continued)

OTHER PUBLICATIONS

YongJing,CN102339565A machine translation 2012 (Year: 2012).*
(Continued)

*Primary Examiner* — Tracie Y Green

(57) ABSTRACT

An LED display panel and a display device are provided. The LED display panel includes at least one LED package module. The LED package module includes: a substrate; an electrode unit disposed on the substrate, the electrode unit comprising an anode layer and a cathode layer disposed opposite to the anode layer; at least one LED chip disposed on the anode layer and the cathode layer; a light shielding structure disposed on the substrate, wherein the light shielding structure comprises a plurality of baffles, the baffles are surrounded to form at least one cavity, and the LED chip is disposed in the cavity; a sealing glue layer disposed on the substrate.

14 Claims, 1 Drawing Sheet

(51) Int. Cl.
*G02F 1/13357* (2006.01)
*G02F 1/1339* (2006.01)

(58) Field of Classification Search
CPC ... H01L 33/486; H01L 33/502; H01L 33/505; H01L 33/507; H01L 33/54; H01L 33/56; H01L 2933/0041; H01L 2933/005; B32B 2457/206
See application file for complete search history.

(56) References Cited

FOREIGN PATENT DOCUMENTS

| CN | 103270612 | 8/2013 |
|---|---|---|
| CN | 105720179 | 6/2016 |
| CN | 109116631 | 1/2019 |
| CN | 208767335 | 4/2019 |
| CN | 111029333 | 4/2020 |
| CN | 111754887 | 10/2020 |
| CN | 212461695 | 2/2021 |

OTHER PUBLICATIONS

Gong et al., CN208767335U machine translation 2019 (Year: 2019).*
International Search Report and the Written Opinion Dated Aug. 29, 2022 From the International Searching Authority Re. Application No. PCT/CN2021/138694 and Its Translation Into English. (15 Pages).
Notification of Office Action and Search Report Dated Mar. 24, 2023 From the State Intellectual Property Office of the People's Republic of China Re. Application No. 202111495725.9 and Its Translation Into English. (21 Pages).
Notification of Office Action and Search Report Dated Dec. 9, 2023 From the State Intellectual Property Office of the People's Republic of China Re. Application No. 202111495725.9 and Its Translation Into English. (24 Pages).

* cited by examiner

LED DISPLAY PANEL AND DISPLAY DEVICE

RELATED APPLICATIONS

This application is a National Phase of PCT Patent Application No. PCT/CN2021/138694 having International filing date of Dec. 16, 2021, which claims the benefit of priority of Chinese Patent Application No. 202111495725.9 filed on Dec. 9, 2021. The contents of the above applications are all incorporated by reference as if fully set forth herein in their entirety.

FIELD AND BACKGROUND OF THE INVENTION

The present application relates to the field of display technologies, and more particularly to an LED display panel and a display device.

The size of a display splicing market has grown year by year. LCD (liquid crystal display) splicing takes a price advantage to occupy a low-end market. In a high-end market, small splicing LEDs (light emitting diodes) are mainstream products. LCD and LED splicing screens can realize low-cost large-screen solutions. However, LCD and LED have different light-emitting principles, and viewing angle performances are very different, resulting in large LED brightness when viewed from a side, which affects an overall look and feel. Therefore, how to control a viewing angle of the LED is an urgent problem to be solved at present.

Technical Problem

LCD and LED splicing screens can realize low-cost large-screen solutions. However, LCD and LED have different light-emitting principles, and viewing angle performances are very different, resulting in large LED brightness when viewed from a side, which affects an overall look and feel.

SUMMARY OF THE INVENTION

Embodiments of the present application provide an LED display panel and a display device. Viewing angle ranges of an LED package module and the LED display panel are adjusted through baffles of a light shielding structure, so as to improve a display quality of the display panel and enhance a user experience.

An embodiment of the application provides an LED display panel comprising at least one LED package module, the LED package module comprising:
  a substrate;
  an electrode unit disposed on the substrate, the electrode unit comprising an anode layer and a cathode layer disposed opposite to the anode layer;
  at least one LED chip disposed on the anode layer and the cathode layer;
  a light shielding structure disposed on the substrate, wherein the light shielding structure comprises a plurality of baffles, the baffles are surrounded to form at least one cavity, the LED chip is disposed in the cavity, and the light shielding structure is formed by ink jetting;
  a sealing glue layer disposed on the substrate, wherein the substrate and the sealing glue layer are surrounded to form a containing cavity, and the electrode unit, the LED chip, and the light shielding structure are all disposed in the containing cavity.

In this embodiment, the LED chip is arranged in the cavity formed by each baffle in the light shielding structure. Part of light emitted by the LED chip in a side view direction is blocked by the baffle, thereby adjusting a viewing angle of the LED display panel. This makes viewing angles of the LED display panels obtained by splicing different types of displays to be the same, which improves a display quality of the display panel and enhances a user experience. By setting different ink composition ratios and jetting process parameters, a requirement of a large aspect ratio of the baffle can be achieved, and a light emission of the LED chip can be avoided. The higher a Tg value, the better a temperature resistance of a board, ensuring a safety of the LED display panel at high temperatures.

In some embodiments of the present application, the anode layer is integrally formed, and the LED chip is connected to the anode layer.

In this embodiment, the anode layer is integrally formed to reduce a circuit connection between the LED chips, making a circuit structure connection more concise.

In some embodiments of the present application, the cathode layer comprises at least one cathode connection unit, the LED chip is connected to the cathode connection unit, and the LED chip and the cathode connection unit are in one-to-one correspondence.

In this embodiment, the cathode layer is split into several cathode connection units, which are flexibly set based on a position of the LED chip, which reduces a requirement for circuit layout space.

In some embodiments of the present application, a top surface of the baffle is wave-shaped, and the top surface is an end of the baffle away from the substrate.

In this embodiment, parameters of the baffle determine a viewing angle of the LED display panel, the top surface of the baffle set to be a wave shape makes a viewing angle change of the LED display panel and a brightness change within a viewing angle range not abrupt, which is more in line with a brightness change curve of the LED display panel.

In some embodiments of the present application, the substrate and the sealing glue layer are surrounded to form a containing cavity, and the electrode unit, the LED chip, and the light shielding structure are all disposed in the containing cavity.

In this embodiment, the substrate and the sealing glue layer are surrounded to form a containing cavity, the containing cavity is an existing structure of the LED display panel, the light shielding structure is arranged in the containing cavity, the containing cavity does not need to be enlarged in size, and while improving a viewing angle, it does not affect a thickness of the LED display panel.

An embodiment of the application provides an LED display panel comprising at least one LED package module, the LED package module comprising:
  a substrate;
  an electrode unit disposed on the substrate, the electrode unit
  comprising an anode layer and a cathode layer disposed opposite to the anode layer; at least one LED chip disposed on the anode layer and the cathode layer;
  a light shielding structure disposed on the substrate, wherein the light shielding structure comprises a plurality of baffles, the baffles are surrounded to form at least one cavity, and the LED chip is disposed in the cavity;

a sealing glue layer disposed on the substrate.

In this embodiment, the LED chip is arranged in the cavity formed by each baffle in the light shielding structure. Part of light emitted by the LED chip in a side view direction is blocked by the baffle, thereby adjusting a viewing angle of the LED display panel. This makes viewing angles of the LED display panels obtained by splicing different types of displays to be the same, which improves a display quality of the display panel and enhances a user experience. By setting different ink composition ratios and jetting process parameters, a requirement of a large aspect ratio of the baffle can be achieved, and a light emission of the LED chip can be avoided. The higher a Tg value, the better a temperature resistance of a board, ensuring a safety of the LED display panel at high temperatures.

In some embodiments of the present application, the anode layer is integrally formed, and the LED chip is connected to the anode layer.

In this embodiment, the anode layer is integrally formed to reduce the circuit connection between the LED chips, making the circuit structure connection more concise.

In some embodiments of the present application, the cathode layer is integrally formed, and the LED chip is connected to the cathode layer.

In this embodiment, the cathode layer is integrally formed to reduce the circuit connection between the LED chips, making the circuit structure connection more concise.

In some embodiments of the present application, the cathode layer comprises at least one cathode connection unit, the LED chip is connected to the cathode connection unit, and the LED chip and the cathode connection unit are in one-to-one correspondence.

In this embodiment, the cathode layer is split into several cathode connection units, which are flexibly set based on a position of the LED chip, which reduces a requirement for circuit layout space.

In some embodiments of the present application, the anode layer includes at least one anode connection unit, the LED chip is connected to the anode connection unit, and the LED chip and the anode connection unit are in one-to-one correspondence.

In this embodiment, the anode layer is split into several anode connection units, which are flexibly set based on a position of the LED chip, which reduces a requirement for circuit layout space.

In some embodiments of the present application, the light shielding structure is formed by ink jetting.

In this embodiment, the requirement of a large aspect ratio of the baffle can be achieved by setting different ink group distribution ratios and jetting process parameters, and affecting a light emission of the LED chip can be avoided.

In some embodiments of the present application, a top surface of the baffle is wave-shaped, and the top surface is an end of the baffle away from the substrate.

In this embodiment, parameters of the baffle determine a viewing angle of the LED display panel, the top surface of the baffle set to be a wave shape makes a viewing angle change of the LED display panel and a brightness change within a viewing angle range not abrupt, which is more in line with a brightness change curve of the LED display panel.

In some embodiments of the present application, the substrate and the sealing glue layer are surrounded to form a containing cavity, and the electrode unit, the LED chip, and the light shielding structure are all disposed in the containing cavity.

In this embodiment, the substrate and the sealing glue layer are surrounded to form a containing cavity, the containing cavity is an existing structure of the LED display panel, the light shielding structure is arranged in the containing cavity, the containing cavity does not need to be enlarged in size, and while improving a viewing angle, it does not affect a thickness of the LED display panel.

In some embodiments of the present application, the substrate is a PCB board whose glass transition temperature exceeds a preset threshold.

In this embodiment, the substrate is a PCB board whose glass transition temperature exceeds a preset threshold. The higher the Tg value, the better the temperature resistance of the board, which ensures safety of the LED display panel at high temperatures.

In some embodiments of the present application, a plurality LED chips are disposed evenly at intervals.

In this embodiment, a plurality of LED chips are arranged at even intervals, and the smaller the distance between the plurality of LED chips 3 is, the more smooth the display change of the LED display panel is.

In some embodiments of the present application, the LED chip is any one or more of a red LED chip, a green LED chip, a blue LED chip, and a white LED chip.

In this embodiment, the LED chip is a core component of an LED lamp, and a color of the light emitted is determined based on the LED chip, and the LED chips of different numbers of colors can be freely combined according to display needs.

In some embodiments of the present application, LED chips and cavities have a one-to-one correspondence.

In this embodiment, the LED chips and the cavities are in one-to-one correspondence, the baffle separates a plurality of LED chips, and each LED chip is arranged in a relatively independent space. The light intensity and viewing angle of each LED chip are adjusted separately to avoid mutual influence.

The embodiment of the present application provides a display device comprising a number of first display panels and the LED display panel as described in any one of the above, wherein the first display panels are connected to the LED display panel.

In some embodiments of the present application, a seam is formed between the first display panel and the first display panel, and the LED display panel is disposed at the seam.

In some embodiments of the present application, the first display panel is an LCD display screen.

In some embodiments of the present application, the LED display panel comprises at least one LED package module, and the LED package module comprises:
  a substrate;
  an electrode unit disposed on the substrate, the electrode unit comprising an anode layer and a cathode layer disposed opposite to the anode layer;
  at least one LED chip disposed on the anode layer and the cathode layer;
  a light shielding structure disposed on the substrate, wherein the light shielding structure comprises a plurality of baffles, the baffles are surrounded to form at least one cavity, and the LED chip is disposed in the cavity;
  a sealing glue layer disposed on the substrate.

In some embodiments of the present application, the anode layer is integrally formed, and the LED chip is connected to the anode layer.

In some embodiments of the present application, the cathode layer is integrally formed, and the LED chip is connected to the cathode layer.

In some embodiments of the present application, the cathode layer comprises at least one cathode connection unit, the LED chip is connected to the cathode connection unit, and the LED chip and the cathode connection unit are in one-to-one correspondence.

In some embodiments of the present application, the anode layer includes at least one anode connection unit, the LED chip is connected to the anode connection unit, and the LED chip and the anode connection unit are in one-to-one correspondence.

In some embodiments of the present application, the light shielding structure is formed by ink jetting.

In some embodiments of the present application, a top surface of the baffle is wave-shaped, and the top surface is an end of the baffle away from the substrate.

In some embodiments of the present application, the substrate and the sealing glue layer are surrounded to form a containing cavity, and the electrode unit, the LED chip, and the light shielding structure are all disposed in the containing cavity.

In some embodiments of the present application, the substrate is a PCB board whose glass transition temperature exceeds a preset threshold.

In some embodiments of the present application, a plurality LED chips are disposed evenly at intervals.

In some embodiments of the present application, the LED chip is any one or more of a red LED chip, a green LED chip, a blue LED chip, and a white LED chip.

In some embodiments of the present application, LED chips and cavities have a one-to-one correspondence.

Beneficial Effect

The LED display panel and the display device provided by the embodiments of the present application are provided with a light shielding structure to surround each LED chip. By adjusting the parameters of the baffle in the light shielding structure, the viewing angle ranges of the LED package module and the LED display panel are adjusted. This makes the viewing angles of the display areas obtained by splicing different types of displays to be the same, which improves the display quality of the display panel and enhances the user experience.

BRIEF DESCRIPTION OF THE SEVERAL VIEWS OF THE DRAWINGS

The following detailed description of the specific implementations of the present application in conjunction with the accompanying drawings will make the technical solutions and other beneficial effects of the present application obvious.

REFERENCE NUMERALS OF DRAWINGS

Figure 1:
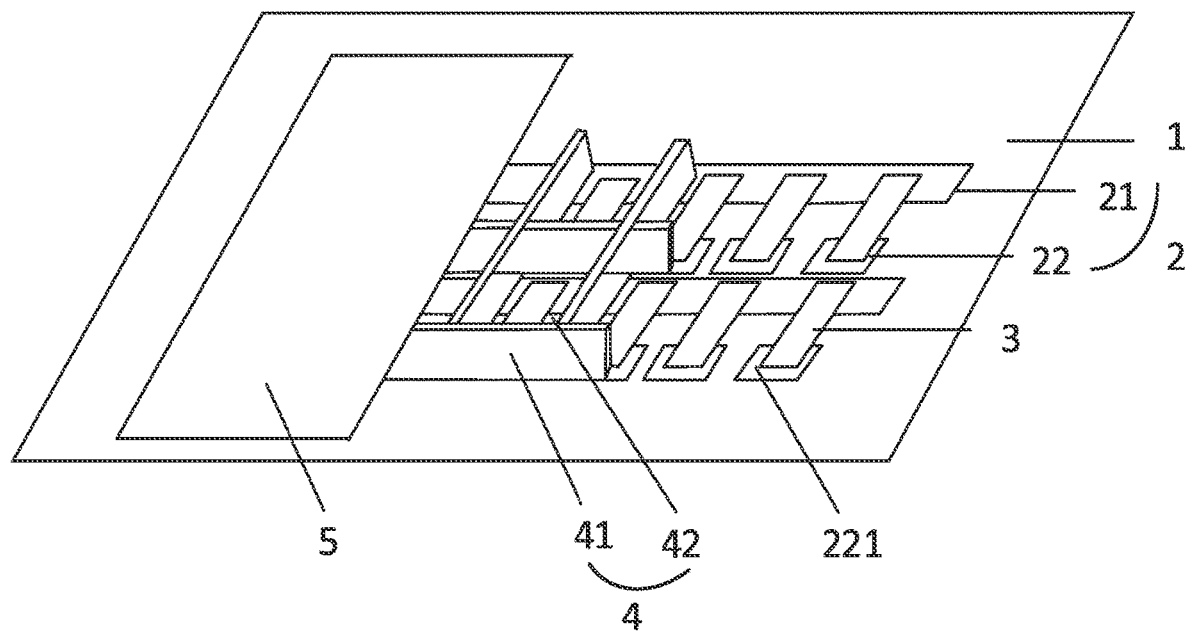
FIG. 1 is a schematic diagram of a structure of an LED package module provided by an embodiment of the application.

1 Substrate; 2 Electrode unit; 21 Anode layer; 22 Cathode layer; 221 Cathode connection unit; 3 LED chip; 4 Light shielding structure; 41 Baffle; 42 Cavity; 5 Sealing glue layer.

DESCRIPTION OF SPECIFIC EMBODIMENTS OF THE INVENTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of this application, it needs to be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or a positional relationship are based on an orientation or positional relationship shown in the drawings. This is only for the convenience of describing the application and simplifying the description, and does not indicate or imply that the device or element referred to must have a specific orientation, be configured and operated in a specific orientation. Therefore, it cannot be understood as a restriction on this application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, "a plurality of" means two or more than two, unless otherwise specifically defined.

In the description of this application, it should be noted that, unless otherwise clearly defined and limited, the terms "installation", "connection", and "link" should be understood in a broad sense. For example, it can be a fixed connection, a detachable connection, or an integral connection. It can be mechanically connected or electrically connected or can communicate with each other. It can be directly connected or indirectly connected through an intermediary. It can be a communication between two elements or an interaction relationship between two elements. For those of ordinary skill in the art, the specific meanings of the above terms in this application can be understood according to specific circumstances.

In this application, unless expressly stipulated and defined otherwise, the "above" or "below" of the first feature of the second feature may include direct contact between the first feature and the second feature. It may also be included that the first and second features are not in direct contact but in contact with another feature between them. Moreover, "above", "upon" and "on top of" the second feature of the first feature include the first feature being directly above and obliquely above the second feature, or merely indicating that the level of the first feature is higher than that of the second feature. The "below", "under" and "underneath" of the second feature of the first feature include the first feature directly below and obliquely below the second feature, or it simply means that the level of the first feature is smaller than the second feature.

The following disclosure provides many different embodiments or examples for realizing different structures of the present application. In order to simplify the disclosure of the present application, the components and settings of specific examples are described below. Of course, they are only examples, and are not intended to limit the application.

In addition, the present application may repeat reference numerals and/or reference letters in different examples. This repetition is for the purpose of simplification and clarity, and does not in itself indicate the relationship between the various embodiments and/or settings discussed. In addition, this application provides examples of various specific processes and materials, but those of ordinary skill in the art may be aware of the application of other processes and/or the use of other materials.

Please refer to FIG. 1, an embodiment of the present application provides an LED display panel. The LED display panel includes at least one LED package module. The LED package module is the smallest unit to realize a display function. The LED package module includes at least one LED chip 3 that emits light. The LED display panel can be obtained by splicing different numbers of LED package modules according to size requirements of a display area, which is not specifically limited in this embodiment.

The LED package module includes a substrate 1, an electrode unit 2, an LED chip 3, a light shielding structure 4, and a sealing glue layer 5. On the one hand, the substrate 1 functions to carry other components, and the other components are all arranged on the substrate 1. On the other hand, a related circuit structure is provided on the substrate 1, which cooperates with other components to realize the display function. Further, the LED package module is electrically connected with other LED package modules through the circuit structure provided on the substrate 1. Multiple LED package modules cooperate to form an LED display panel to achieve display functions.

The electrode unit 2 is provided on the substrate 1. The electrode unit 2 includes an anode layer 21 and a cathode layer 22. The anode layer 21 and the cathode layer 22 are both made of metal, and both are arranged on the substrate 1. The anode layer 21 and the cathode layer 22 are arranged opposite to each other, and the anode layer 21 and the cathode layer 22 are spaced apart from each other. The anode layer 21 and the cathode layer 22 are not directly connected to each other. The electrode unit 2 is connected to the circuit structure provided on the substrate 1. Further, the LED package modules are also connected to each other through the circuit structure provided on the respective substrate 1 so as to coordinately connect a plurality of LED package modules.

The LED chip 3 is also called an LED light-emitting chip, which is a core component of an LED lamp, that is, a P-N junction. Its main function is to convert electrical energy into light energy. The main material of the chip is monocrystalline silicon. Based on the color of the light emitted by the LED chip, the LED chip 3 includes a red LED chip, a green LED chip, a blue LED chip, and a white LED chip. The LED package module includes at least one LED chip 3, which can be any one of the above-mentioned red LED chip, green LED chip, blue LED chip, and white LED chip. It may also be that a plurality of LED chips 3 are connected in sequence, which is not specifically limited in this embodiment.

If the LED package module includes a plurality of LED chips 3, an arrangement order of the plurality of LED chips 3 is set based on realization requirements of the display function. For example, the red LED chip, the green LED chip, and the blue LED chip are cyclically arranged in the order. In addition, if the LED package module contains multiple LED chips 3, the multiple LED chips 3 are evenly spaced. The smaller the distance between the plurality of LED chips 3 is, the smoother a display change of the LED display panel is. Therefore, a distance between the LED chips 3 can be set according to requirements of display accuracy, which is not specifically limited in this embodiment.

The LED chip 3 is arranged on the anode layer 21 and the cathode layer 22. One end of the LED chip 3 is connected to the anode layer 21, and the other end of the LED chip 3 is connected to the cathode layer 22. The electrical connection is used to realize the display function, and the specific connection manner is not specifically limited in this embodiment. That is, the anode layer 21 and the cathode layer 22 are connected through the LED chip 3. The anode layer 21 and the cathode layer 22 are not directly connected to each other. In addition, if the LED package module contains multiple LED chips 3, the anode layer 21 and the cathode layer 22 of the electrode unit 2 have the same number of connection points as the LED chip 3. The anode layer 21 and the cathode layer 22 of all the electrode units 2 are connected to the circuit structure provided on the substrate 1. It may be that the anode layer 21 and the cathode layer 22 of the electrode unit 2 are respectively connected to the circuit structure provided on the substrate 1. It may also be that after the anode layer 21 and the cathode layer 22 of the electrode unit 2 are connected themselves, they are then connected as a whole to the circuit structure provided on the substrate 1, which is not specifically limited in this embodiment. That is to say, the structure of the cathode layer 22 and the anode layer 21 can select all the connection points to be integrally formed or arranged at intervals according to display needs or space arrangement requirements, which is not specifically limited in this embodiment.

The light shielding structure 4 is provided on the substrate 1. The light shielding structure 4 is used to shield part of the light emitted by the LED chip 3, thereby changing the viewing angle range and the brightness within the viewing angle of the LED display panel. This makes the viewing angle range of the LED display panel match the spliced LCD display. This avoids different viewing angles in the same display area, which will affect the display effect. The light shielding structure 4 includes a plurality of baffles 41. The plurality of baffles 41 surround and form at least one cavity 42, and the LED chip 3 is disposed in the cavity 42. That is to say, the baffle 41 separates a plurality of LED chips 3, and each LED chip 3 is arranged in a relatively independent space. The shape and structure of the cavity 42 may be rectangular. Regular shapes such as a circle may also be other irregular shapes, which are not specifically limited in this embodiment.

Because the light emitted by the LED chip is blocked by the baffle 41, the viewing angle of the LED display panel will be changed. The LED chips 3 and the cavities 42 have a one-to-one correspondence, and the parameters of the baffle 41 arranged around each cavity 42 determine the range of light emitted by the LED chip within the corresponding cavity 42 that can be seen. That is, the parameters of the baffle 41 determine the viewing angle of the LED display panel. Therefore, the viewing angle of the LED display panel can be changed according to the parameters of the adjustment baffle 41. The actual situation can be set according to the requirements of the viewing angle. For example, based on the measured viewing angle brightness of the LCD and LED, and comparing the difference between the two, reasonable parameters of the baffle 41 can be calculated. Alternatively, the optimal parameters of the baffle 41 can be obtained through experimental verification, which is not specifically limited in this embodiment.

Figure 2:
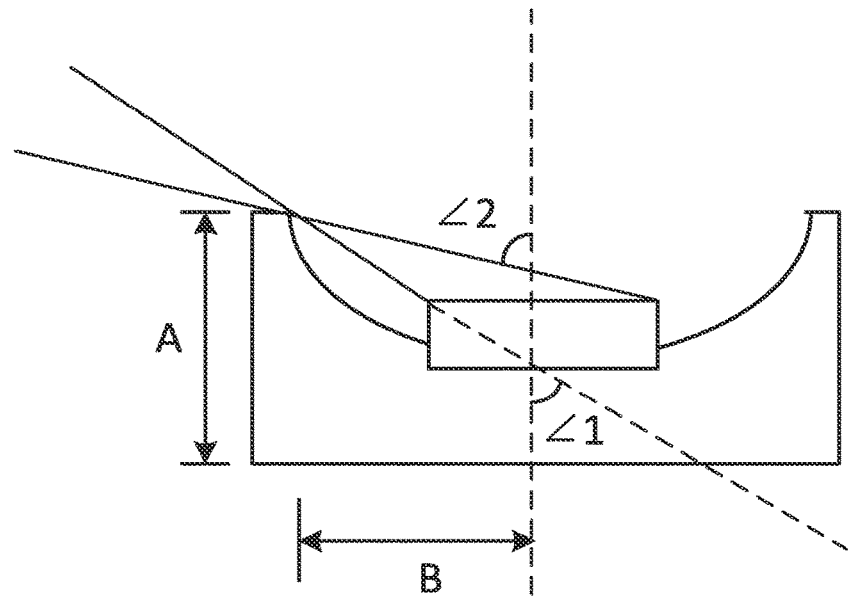
FIG. 2 is a schematic cross-sectional view of an LED package module chip and baffles provided by an embodiment of the application.

The parameters of the baffle 41 include a height of the baffle 41 and a distance between the baffle 41 and the LED chip 3. As shown in FIG. 2, the baffle 41 and the LED chip 3 themselves have a certain thickness. The distance between the baffle 41 and the LED chip 3 is a vertical distance from an upper end of an inner edge of the baffle 41 on a side close to the LED chip 3 to a geometric center normal of the LED chip 3. The height of the baffle 41 is the vertical distance from a top surface of the baffle 41 (the end far from the substrate 1) to a bottom surface of the LED chip 3 (the end close to the substrate 1).

It can be seen from FIG. 2 that the baffle 41 in a normal direction of the LED chip 3 does not block the light emitted by the LED chip. That is, a front-view brightness of the LED display panel is the highest. ∠1 is an angle between a first connection line and a normal line of the LED chip 3. The first connection is the connection between the inner edge of the baffle 41 on the side close to the LED chip 3 and the upper edge of the LED chip 3 close to the inner edge. ∠2 is the angle between a second connection line and the normal line of the LED chip 3. The second connection line is the connection line between the inner edge of the baffle 41 on the side close to the LED chip 3 and the upper edge of the LED chip 3 away from the inner edge. Within the viewing angle range from the normal line of the LED chip 3 to ∠1, the baffle 41 does not block the light emitted by the LED chip. The LED display panel has the highest brightness. When the viewing angle is greater than ∠1, part of the light emitted by the LED chip 3 is blocked by the baffle 41, and the brightness is reduced. When the viewing angle is between ∠1 and ∠2, although part of the light emitted by the LED chip 3 is blocked by the baffle 41, part of the light can still be seen, but the brightness is reduced. When the viewing angle is greater than ∠2, all the light emitted by the LED chip 3 is blocked by the baffle 41, and the brightness in the viewing angle range is 0. That is, the adjustment of the viewing angle range of the LED display panel is realized. It should be noted that the aforementioned parameters of the baffle 41 are the main factors affecting the viewing angle range of the LED display panel. The selection of the reference point is only an example for ease of understanding, and should not be construed as a limitation to this embodiment. It can also be evaluated and adjusted according to other equivalent parameters with the same effect, which is not specifically limited in this embodiment.

The sealing glue layer 5 is disposed on the substrate 1. The sealing glue layer 5 is formed by casting glue to ensure an airtightness of the LED package module structure and prevent other components from being damaged due to exposure.

In this embodiment, a light shielding structure 4 is provided to surround each LED chip 3. By adjusting the parameters of the baffle 41 in the light shielding structure 4, the viewing angle ranges of the LED package module and the LED display panel are adjusted. This makes the viewing angles of the display areas obtained by splicing different types of displays to be the same, which improves the display quality of the display panel and enhances the user experience.

In one embodiment, the anode layer 21 is integrally formed. That is, all the anode layers 21 are a whole, and they are not separated from each other. All the LED chips 3 are connected to the same anode layer 21, thereby reducing the wiring arrangement of the circuit structure and saving space. However, it should be noted that if the number of LED chips 3 included in the LED package module is large, the corresponding LED chips 3 have more connection points on the anode layer 21. Due to factors such as space arrangement and other factors, all of them cannot be integrally formed, part of the anode layer 21 is integrally formed. It can be set according to the actual layout of the LED package module, and this embodiment does not make specific restrictions. In addition, the cathode layer 22 is similar to the anode layer 21, and part or all of it can be integrally formed.

In one embodiment, the cathode layer 22 includes at least one cathode connection unit 221. The LED is connected to the cathode connection unit 221. If the cathode layer 22 includes a plurality of cathode connection units 221, the respective cathode connection units 221 are not connected to each other at intervals. The LED and the cathode connection unit 221 are in one-to-one correspondence, and the structural arrangement is simpler. In addition, the anode layer 21 is similar to the cathode layer 22. The anode layer 21 includes at least one anode connection unit. The LED is connected to the anode connection unit. If the anode layer 21 includes a plurality of anode connection units (not shown), the respective anode connection units are not connected to each other at intervals. The LEDs correspond to the anode connection unit one to one.

In one embodiment, the light shielding structure 4 is formed by ink jetting. The viewing angle of the LED display panel is changed according to the parameters of the adjustment baffle 41. For example, based on the measured viewing angle brightness of the LCD and LED, and comparing the difference between the two, reasonable parameters of the baffle 41 can be calculated. Alternatively, the optimal parameters of the baffle 41 can be obtained through experimental verification. After determining the parameters of the baffle 41, the composition ratio of the ink and the jetting process parameters are analyzed. A number of baffles 41 are formed by ink jetting to obtain the light shielding structure 4. It should be noted that the baffle 41 that needs to meet the parameter requirements can be directly sprayed by adjusting the composition ratio of the ink and the spraying process parameters. The baffle 41 required by the corresponding different parameters corresponds to different ink composition ratios and jetting process parameters. This embodiment does not specifically limit the specific analysis process. In addition, when the anode layer 21 or the cathode layer 22 is formed integrally, the baffle 41 will cover part of the anode layer 21 or the cathode layer 22. In order to reduce the influence of the baffle 41 on the anode layer 21 or the cathode layer 22, a plurality of baffles 41 with a large aspect ratio are formed by ink jetting to obtain the light shielding structure 4.

In one embodiment, the substrate 1 and the sealing glue layer 5 are enclosed to form a containing cavity. The electrode unit 2, the LED chip 3 and the light shielding structure 4 are all arranged in the containing cavity. The LED package module in the prior art does not include the light shielding structure 4. The substrate 1 and the sealing glue layer 5 are also surrounded to form a receiving cavity. The electrode unit 2 and the LED chip 3 are both arranged in the containing cavity. There is a certain space between the substrate 1 and the sealing glue layer 5. In this embodiment, a light shielding structure 4 is provided between the substrate 1 and the sealing glue layer 5. The size of the light shielding structure 4 is small. Compared with the structure of the LED package module in the prior art, the containing cavity in this embodiment does not need to be enlarged in size. Therefore, while improving the viewing angle, the thickness of the LED display panel is not affected.

In one embodiment, the substrate 1 is a high Tg PCB (printed circuit board). Tg refers to the glass transition temperature, which is a glass transition temperature of a board under high temperature heating. Generally, Tg boards are above 130 degrees. High Tg is generally greater than 170 degrees, and medium Tg is approximately greater than 150 degrees. That is to say, the substrate 1 is a PCB board whose glass transition temperature exceeds a preset threshold. The higher the Tg value, the better the temperature resistance of the board.

In this embodiment, a light shielding structure 4 is provided to surround each LED chip 3. By adjusting the parameters of the baffle 41 in the light shielding structure 4, the viewing angle range of the LED package module and the LED display panel is adjusted. This makes the viewing angles of the display areas obtained by splicing different types of displays to be the same, which improves the display quality of the display panel and enhances the user experience. Further, the light shielding structure 4 is formed by ink jetting, the structure size is small, and the thickness of the LED display panel is not affected.

An embodiment of the present application provides a display device including a plurality of first display panels and the LED display panel as described in any one of the above embodiments. The first display panel is connected with the LED display panel. Several first display panels and LED display panels are spliced together to obtain a display device with a larger display area. Referring to FIG. 1, the LED display panel includes at least one LED package module, and the LED package module includes:
- a substrate 1;
- an electrode unit 2 disposed on the substrate 1, the electrode unit 2 comprising an anode layer 21 and a cathode layer 22 disposed opposite to the anode layer 21;
- at least one LED chip 3 disposed on the anode layer 21 and the cathode layer 22;
- a light shielding structure 4 disposed on the substrate 1, wherein the light shielding structure 4 comprises a plurality of baffles 41, the baffles 41 are surrounded to form at least one cavity 42, and the LED chip 3 is disposed in the cavity 42;
- a sealing glue layer 5 disposed on the substrate 1.

In an embodiment, the anode layer 21 is integrally formed, and the LED chip 3 is connected to the anode layer 21.

In some embodiments of the present application, the cathode layer 22 is integrally formed, and the LED chip 3 is connected to the cathode layer 22.

In an embodiment, the cathode layer 22 comprises at least one cathode connection unit 221, the LED chip is connected to the cathode connection unit 221, and the LED chip and the cathode connection unit 221 are in one-to-one correspondence.

In some embodiments of the present application, the anode layer 21 includes at least one anode connection unit (not shown), the LED chip 3 is connected to the anode connection unit, and the LED chip 3 and the anode connection unit are in one-to-one correspondence.

In an embodiment, the light shielding structure 4 is formed by ink jetting.

In an embodiment, a top surface of the baffle 41 is wave-shaped, and the top surface is an end of the baffle 41 away from the substrate.

In an embodiment, the substrate 1 and the sealing glue layer 5 are surrounded to form a containing cavity, and the electrode unit 2, the LED chip 3, and the light shielding structure 4 are all disposed in the containing cavity.

In an embodiment, the substrate 1 is a PCB board whose glass transition temperature exceeds a preset threshold.

In some embodiments of the present application, a plurality LED chips 3 are disposed evenly at intervals.

In some embodiments of the present application, the LED chip 3 is any one or more of a red LED chip, a green LED chip, a blue LED chip, and a white LED chip.

In some embodiments of the present application, LED chips 3 and cavities 42 have a one-to-one correspondence.

In one embodiment, a seam is formed between the first display panel and the first display panel. The LED display panel is arranged at the joint. On the one hand, the LED display panel can eliminate the joints visually. On the other hand, the viewing angle is improved, and the display quality of the display panel is improved.

In one embodiment, the first display panel is an LCD display screen.

In this embodiment, a light shielding structure is provided to surround each LED chip. By adjusting the parameters of the baffle in the light shielding structure, the viewing angle ranges of the LED package module and the LED display panel are adjusted. This makes the viewing angles of the display areas obtained by splicing different types of displays to be the same, which improves the display quality of the display panel and enhances the user experience. Further, the light shielding structure is formed by ink jetting, the structure size is small, and the thickness of the LED display panel is not affected.

In the foregoing embodiments, the description of each embodiment has its own focus. For parts that are not described in detail in a certain embodiment, reference may be made to related descriptions of other embodiments. Specifically, the LED package modules have been described in detail in the embodiments of the LED display panel, so the LED package modules are not described in detail in the embodiment of the display device. For the specific implementation of the LED package module in the display device, refer to the relevant description of the embodiment of the LED display panel.

The LED display panel and the display device provided by the embodiments of the present application are described in detail above. Specific examples are used in this article to illustrate the principle and implementation of this application. The descriptions of the above embodiments are only used to help understand the technical solutions and core ideas of the present application. Those of ordinary skill in the art should understand that they can still modify the technical solutions described in the foregoing embodiments. Or equivalently replace some of the technical features. However, these modifications or replacements do not cause the essence of the corresponding technical solutions to deviate from the scope of the technical solutions of the embodiments of the present application.

What is claimed is:

1. A display device, comprising:
    a number of first display panels and a light emitting diode (LED) display panel, wherein the first display panels are connected to the LED display panel;
    wherein the LED display panel comprises:
        at least one LED package module comprising:
            a substrate;
            an electrode unit disposed on the substrate, the electrode unit comprising an anode layer and a cathode layer disposed opposite to the anode layer;
            at least one LED chip disposed on the anode layer and the cathode layer;
            a light shielding structure disposed on the substrate, wherein the light shielding structure comprises a plurality of baffles, the baffles are surrounded to form at least one cavity, and the LED chip is disposed in the cavity; and a sealing glue layer disposed on the substrate;

wherein a viewing angle of the LED display panel is the same as a viewing angle of each of the first display panels.

2. The display device according to claim 1, wherein a seam is formed between the first display panel and the first display panel, and the LED display panel is disposed at the seam.

3. The display device according to claim 1, wherein the first display panel is an LCD display screen.

4. The display device according to claim 1, wherein the anode layer is integrally formed, and the LED chip is connected to the anode layer.

5. The display device according to claim 1, wherein the cathode layer is integrally formed, and the LED chip is connected to the cathode layer.

6. The display device according to claim 1, wherein the cathode layer comprises at least one cathode connection unit, the LED chip is connected to the cathode connection unit, and the LED chip and the cathode connection unit are in one-to-one correspondence.

7. The display device according to claim 1, wherein the anode layer comprises at least one anode connection unit, the LED chip is connected to the anode connection unit, and the LED chip and the anode connection unit are in one-to-one correspondence.

8. The display device according to claim 1, wherein the light shielding structure is formed by ink jetting.

9. The display device according to claim 1, wherein a top surface of the baffle is wave-shaped, and the top surface is an end of the baffle away from the substrate.

10. The display device according to claim 1, wherein the substrate and the sealing glue layer are surrounded to form a containing cavity, and the electrode unit, the LED chip, and the light shielding structure are all disposed in the containing cavity.

11. The display device according to claim 1, wherein the substrate is a PCB board whose glass transition temperature exceeds a preset threshold.

12. The display device according to claim 1, wherein a plurality LED chips are disposed evenly at intervals.

13. The display device according to claim 1, wherein the LED chip is any one or more of a red LED chip, a green LED chip, a blue LED chip, and a white LED chip.

14. The display device according to claim 1, wherein LED chips and cavities have a one-to-one correspondence.

* * * * *